Patented July 25, 1939

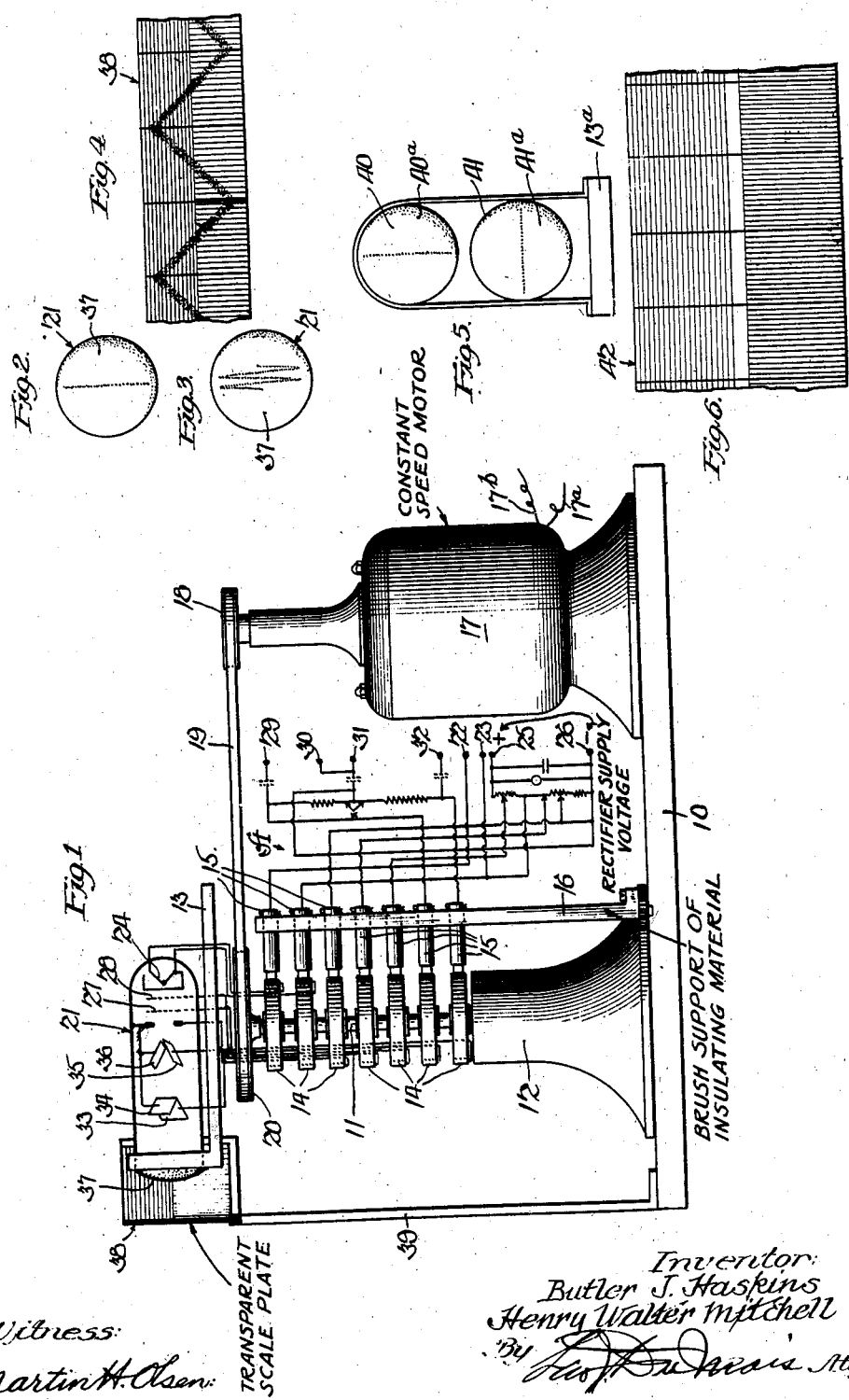

2,167,177

UNITED STATES PATENT OFFICE 2,167,177

MEANS FOR PRODUCING A SWEEP WAVE OPTICAL PICTURE WITH A CATHODE RAY TUBE

Butler J. Haskins, Chicago, and Henry Walter Mitchell, Waukegan, Ill., assignors to The Potter Company, a corporation of Delaware Application December 4, 1936, Serial No. 114,198

2 Claims. (Cl. 171—95)

This invention relates to means for producing a sweep wave optical picture with a cathode ray tube for investigating and measuring electrical or physical qualities of a device under test.

Heretofore, the cathode ray tube has been employed in various ways to trace an electron stream upon a fluorescent coating applied to the end or walls of the tube and in order to investigate and measure the same, costly and elaborate methods were employed, and errors introduced due to wire capacity and other stray currents involving expensive shieldings, and the mechanism was at no time inherently accurate.

Investigation of electrical phenomena, such as wave forms, voltage and current with a cathode ray tube requires that some means be provided whereby the electron stream placed under the influence of the phenomena, in order to be observed or studied, be caused to sweep across a screen in accordance with a predetermined time base.

It is a primary object of the present invention to provide a means whereby the above objections referred to are overcome and wherein the electron stream of the cathode ray tube may be accurately investigated and measured to determine the variations and amplitude in respect to time of the electrical or physical qualities of a device under test.

A further object is to provide means for carrying a cathode ray tube in a path while connected with a device to be tested, for producing a sweep wave optical picture of the electrical or physical qualities of the device.

And a further object is to provide a transparent scale through which the stream of electrons produced on the fluorescent coating of the cathode ray tube is clearly visible for ascertaining the electrical or physical qualities of a device under test.

And a still further object is the provision of a scale in the path of movement of the cathode ray tube which scale serves to indicate to the observer, the qualities of the device under test in accordance with a predetermined time base.

In the drawing:

Figure 1 is a view in side elevation of an apparatus illustrating a means for mounting a cathode ray tube in accordance with our invention.

Figure 2 is an end view of a cathode ray tube, illustrating a stream of electrons traced on the fluorescent end thereof, while the tube remains stationary.

Figure 3 is an end view of a cathode ray tube, illustrating a stream of electrons traced on the fluorescent end thereof, while the tube remains stationary and a variation in the electron stream occurs.

Figure 4 is a face view of a scale, illustrating the sweep wave optical picture produced thereon while the cathode ray tube is moved in a path.

Figure 5 is an end view of a pair of cathode ray tubes arranged in superposed relation, wherein one tube projects its electron stream for amplitude and the other, for time; and Figure 6 is a face view of a scale employed with the pair of cathode ray tubes shown in Fig. 5.

The apparatus shown comprises a base 10 on which a vertical spindle 11 is carried in a journal 12. The spindle 11 carries an arm 13 and a plurality of rings 14, which are arranged in spaced relation thereon and which rings each contact a brush 15 carried in an upright member of insulation material 16 that is secured to the base 10. A motor 17 is also carried on the base 10 and is provided with a pulley 18 which has a belt 19 therearound that extends to a pulley 20 fixed to the spindle 11. This motor 17 has leads 17a and 17b which may be connected to a source of power, and the motor may be of any suitable type, but is preferably of the constant speed type for driving the spindle 11 to drive the arm 13 at a constant rate of speed. A cathode ray tube 21 is secured to the arm 13 and is adapted to be driven therewith under the control of the motor, and this cathode ray tube is connected through the rings 14 and brushes 15 to a conventional form of oscillograph circuit, designated as a whole as A.

As a conventional form of circuit is shown, it is thought that a brief explanation of the wiring connections will suffice for a thorough understanding of its application with the device. The circuit A has terminals 22—23 for the heater supply of the element 24 and terminals 25—26 from the rectifier for the anode 27 and grid 28, while the terminals 29—30 and 31—32 are for connecting the device under test to the pairs of plates 33—34 and 35—36, respectively, of the cathode ray tube 21.

During the operation of the apparatus with the cathode ray tube 21 in position on the arm 13 and with a device under test connected with the circuit A, a stream of electrons is traced on the fluorescent end 37 of the cathode ray tube. As the apparatus is rotated at a constant rate of speed by the motor 17, the tube is carried therewith and the stream of electrons traced on the fluorescent end 37 of the tube will appear visible to the eye as a sweep wave optical picture, and should any variation occur in the wave, it will be readily detected.

In order to accurately trace and measure the sweep wave produced by the cathode ray tube during the operation of the device, a scale 38 is provided. This scale 38 is supported on a frame 39 secured to the base 10 and supports the scale 38 in proper alignment with the cathode ray tube 21. This scale 38 may be of any transparent material through which the stream of electrons traced on the fluorescent end 37 of the cathode ray tube will be visible, and the amplitude and time may be accurately measured.

As the tube 21 is driven at a constant rate of speed, through 360 degrees, the stream of electrons traced on the fluorescent end 37 of the tube will be visible with each cycle of operation of the apparatus, or in other words, the sweep wave optical picture will be repeated many times during the test. In this manner it is possible to accurately measure the amplitude and time of the qualities of the device under test, and a greater flexibility of measurements are made possible by the use of a cathode ray tube. This type of tube provided with time axis and deflection electrodes, produces a picture of the phenomena being studied on the fluorescent end wall of the tube, which picture is spread out and rapidly repeated on the scale plate to facilitate the study and analysis of the device under test.

In Figure 4, is shown a type of scale employed in connection with the apparatus. This scale has graduations thereon arranged in accordance with the amplitude and a predetermined time base, the scales being interchangeable to conform with the type of device under test.

While the apparatus remains stationary and a stream of electrons are traced on the fluorescent end 37 of the cathode ray tube 21 with slight variations of the electrical or physical qualities of the device under test, it is rather difficult to measure the amplitude and base thereof which in effect is similar to that shown in Figure 3, but while the apparatus is in motion, the time base will be carried over a given area, as indicated, while the amplitude remains the same as indicated in Figure 4.

In Figure 5, a modified form is illustrated in which a pair of cathode ray tubes 40—41 are carried in superposed relation on an arm 13a and are adapted to move in a path therewith, but in this instance, the tube 40 is arranged to trace a stream of electrons for amplitude on the fluorescent end 40a thereof, while the tube 41 is arranged to trace a stream of electrons for time base on the fluorescent end 41a thereof, the scale indicated in Figure 6 being illustrative of the type of scale for use in connection with a double type of tube as above described.

While we have referred to the apparatus generally and to the circuit A as being of a conventional type of oscillograph circuit, it will be understood that various types of apparatus and circuits may be employed in which a device under test may be connected with a cathode ray tube that is adapted to move in a path and also other means of connecting the circuit with the tube may be employed, as our invention relates particularly to the means for supporting and moving a cathode ray tube in a path to produce a sweep wave optical picture and to trace a stream of electrons on the fluorescent end thereof with a scale positioned for accurately investigating and measuring the amplitude and time of the qualities of the device under test.

We claim:

1. An apparatus for producing a sweep wave optical picture of the electrical and physical qualities of a device under test comprising the combination of a cathode ray tube, means for bodily revolving said tube at a constant rate of speed, a circuit for the tube for producing a stream of electrons against the end of said tube and for deflecting said stream in response to the electrical and physical qualities of the device under test, and a viewing screen having a scale thereon and through which screen the deflected electron stream is visible.

2. An apparatus for measuring the electrical and physical qualities of a device under test comprising the combination of a cathode ray tube, means for revolving said tube through 360° at a constant rate of speed, a circuit for the tube and to connect the device under test for producing and deflecting a stream of electrons against the end of said tube in response to the electrical and physical qualities of the device, and a transparent scale through which the deflected stream of electrons is visible to be measured.

BUTLER J. HASKINS.
HENRY WALTER MITCHELL.